No. 703,501. Patented July 1, 1902.
T. THISTLEWOOD.
SELF LUBRICATING HUB BEARING.
(Application filed Sept. 7, 1901.)
(No Model.)
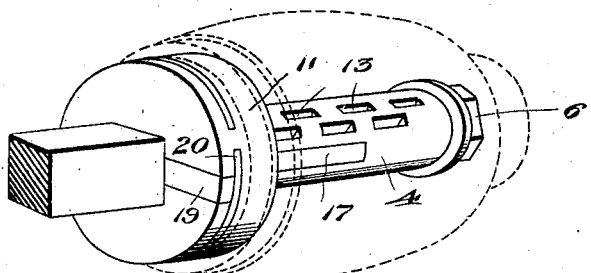
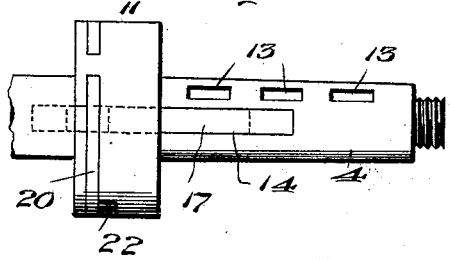
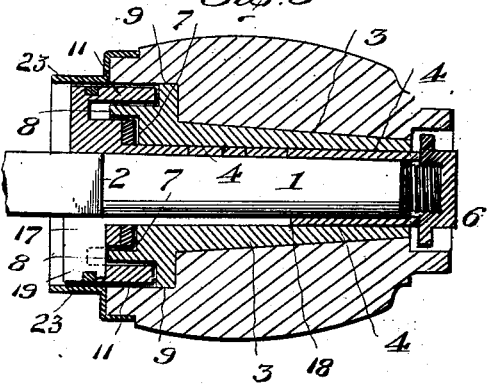
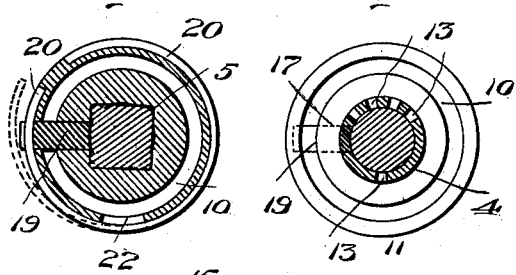
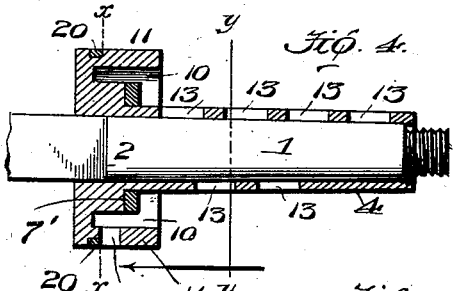
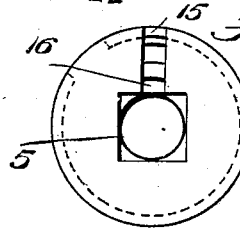
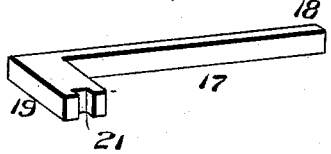
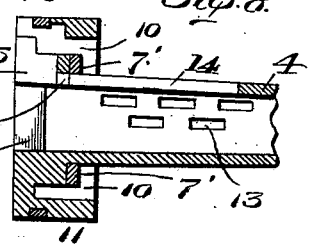
Witnesses
Inventor
Theodore Thistlewood
By Johnson and Johnson
Attorneys
THE NORRIS PETERS CO., PHOTO-LITHO., WASHINGTON, D. C.

UNITED STATES PATENT OFFICE.

THEODORE THISTLEWOOD, OF HARRINGTON, DELAWARE.

SELF-LUBRICATING HUB-BEARING.

SPECIFICATION forming part of Letters Patent No. 703,501, dated July 1, 1902.

Application filed September 7, 1901. Serial No. 74,650. (No model.)

*To all whom it may concern:*

Be it known that I, THEODORE THISTLEWOOD, a citizen of the United States of America, residing at Harrington, in the county of Kent and State of Delaware, have invented certain new and useful Improvements in Self-Lubricating Hub-Bearings for Axles, of which the following is a specification.

My improvement is directed to the production of an improved wear-sleeve for the axles of vehicles, and especially to provision for lubricating the wear-sleeve, the hub-box, and the axle-arm, and in the claims appended hereto, in connection with the accompanying drawings, I will point out the precise improvements.

Figure 1 shows the axle wear-sleeve in perspective. Fig. 2 is a side view of the same, showing the oil-displacing plunger in the oil-feed slot in the wear-sleeve. Fig. 3 is a longitudinal section of the same including the wheel-hub and taken through the displacing-plunger 17. Fig. 4 shows the wear-sleeve in longitudinal section upon the axle-arm. Fig. 5 is a cross-section of the same on the line $x\ x$ of Fig. 4. Fig. 6 is a cross-section of the enlarged end of the sleeve on the lines $y\ y$ of Fig. 4, showing the spring for locking the oil-displacing plunger. Fig. 7 shows a plunger for displacing the oil from a feed duct or slot in the wear-sleeve, to distribute the oil into pockets in the wear-sleeve, and for sealing the feed duct or slot. Fig. 8 shows the wear-sleeve in longitudinal section with the oil-displacing plunger removed. Fig. 9 shows in end view the shouldered or enlarged end of the sleeve with the plunger removed.

The axle has the usual wheel-bearing arm 1, which joins the axle by a square shoulder 2, while the hub of the wheel has the usual box or skein 3 fixed therein upon a wear-sleeve 4, which forms the bearing for the box and which fits closely and has a fixed relation to the axle-arm, so that the wheel-hub has a freely-rotatable seating upon the wear-sleeve, which thereby takes all the wear from the axle-arm, increases its diameter, gives it greater strength, and renders it more durable. At its inner or enlarged end the bore or inner wall of the wear-sleeve forms a square hole 5, Figs. 5, 8, and 9, to fit the square of the axle-shoulder 2, Figs. 3 and 4, whereby the wear-sleeve is locked to the axle-arm.

The hub and the wear-sleeve are secured upon the axle-arm by the flanged nut 6, the action of which is to force the square shoulder 5 of the wear-sleeve against the square end 2 of the axle-arm.

The inner end of the axle box or skein is enlarged, and this enlargement terminates in a recess within the hub-recess and has an annular recess forming a shoulder 7, terminating at the interior wall of the box, Fig. 3, a concentric projection or collar 8, forming said recess and overhanging said shoulder 7, and has also a circumferential shoulder 9, joining the outer wall of the collar 8 and back of the bottom of the recess which forms the shoulder 7.

A sleeve to take the wear from the axle-arm and to form the fixed journal for the hub-box is not new; but my improvement resides in a construction and in provision whereby oil is supplied to it by a displacing-plunger to render its wear function more effective and more durable not only as to the sleeve itself, but as to the hub box or skein and to the axle-arm.

The inner end of the wear-sleeve is enlarged and is cylindrical, adapted to fit within the recess of the hub and formed with an annular space 10 to receive the collar 8 on the hub-box. This annular space is formed by the rim 11, the inner wall of which forms a wear-surface on the outer wall of the collar 8. This rim-sleeve part 11 thereby forms a fixed wear part for the hub, while the hub-box-collar part 8 forms a rotating wear part for the hub, the collar part 8 and the rim part 11 lapping with each other to form such wear parts. Cooperating with these lapping wear parts 8 and 11 the hub-box has an inner and an outer shoulder 7 and 9, which stand at right angles to the lapping wear parts and against which the hub-box is set and secured by the axle-nut 6.

The wear-shoulder 7 has a wear packing-ring 7' within the recess and rotating with the sleeve 4, and this packing-ring, the rim 11, and the shoulder 9 coact to render effective the close joining of the enlarged ends of the hub-box and the wear-sleeve.

It is important to note that the telescoping engagement of the collar 8 of the hub-box with the interior wear-surfaces of the wear-sleeve at their enlarged coupled ends serves to give steadiness and firmness to the rolling of the wheel upon the fixed wear-sleeve.

As a means for lubricating the hub and axle wear parts the wear-sleeve 4 has oil-receiving pockets 13 along its length, which open on the surface of the axle-arm and on the inner wall of the hub-box, as in Figs. 3 and 4. These pockets are preferably disposed in staggered rows on the upper side of the wear-sleeve and also a row on the under side of the sleeve, as in Figs. 1, 4, and 6. Between these pockets the sleeve has a slot 14 extending through the enlarged end, at which it opens, as shown in Figs. 8 and 9. This slot passes under the ring-packing 7' and opens into the enlarged open end 15, Fig. 8, thereby forming an open way into which an oil-can nozzle can be introduced to inject oil through a hole 16 to fill the slot 14 in the wear-sleeve, as in Fig. 8. This slot, charged with oil, is not a feeder for lubricating the wear-sleeve; but the pockets are for this purpose, and to transfer the oil from this slot I provide a plunger 17, exactly fitting the slot 14, and when pushed into it from its enlarged end through the hole 16 will cause the displacement of the oil from the slot and force it into the pockets 13, from which the rotation of the hub-box on the sleeve will have the effect of gradually drawing the oil out of the pockets around the wear-sleeve and the bearing-wall of the hub-box. This oil-displacing action of the plunger is by its end 18 as it is driven into the slot 14, and when so driven in its enlarged end 19 is formed to close the opening 15 in the enlarged end of the wear-sleeve and seals it from dust.

The plunger is flat and in filling the slot is flush with the wear-surface and forms a part of the sleeve.

To retain the plunger in place and allow its quick and easy removal to charge the slot, a spring-catch 20, seated in a circumferential groove in the rim 11 of the wear-sleeve, is adapted to engage a notch 21, Fig. 7, in the enlarged end of the plunger and lock it in place.

To remove the plunger, the free end of the spring is raised to free the notch 21, as in dotted lines in Fig. 5.

I find it very advantageous to provide for the discharge of the worn-out oil, which by the constant friction on the wear-surfaces tends to harden the oil and to lessen its effectiveness. For this purpose a hole 22, Figs. 4 and 5, is made in the bottom of the rim 11, so that the residuum of the spent oil tends to work back to the enlarged end of the sleeve and under the collar 8 into the bottom of the recess 10 and out of the opening 22. This recess 10 therefore serves to gather the spent oil and to receive the wear-collar 8 of the hub-box, the turning of which with the wheel tends to work the spent oil from the wear-sleeve out over the packing-ring 7' at the box-shoulder 7, and thereby give more effective lubrication to the wear-sleeve.

The wear of the axle-fastening nut will always give more or less endwise movement of the wear-sleeve and the hub-box upon the axle-arm, and to reduce this wear the sleeve-pockets 13 and the oil-displacing slot 14 open on the axle-arm through the sleeve, and thereby the lubrication is made effective on the inner side of the wear-sleeve on the axle-arm and on the outer sides of the wear-sleeve on the hub-box.

In Fig. 3 the usual hub dust-band 23 is seen as covering the enlarged end of the wear-sleeve, and therefore covers the waste-opening 22, and while the dust-band does not prevent the escape of the oil it prevents the accumulation of dust in the recess 10 of the wear-sleeve. The dust-band also covers the opening 15 in the enlarged end of the wear-sleeve which receives the enlarged end of the plunger-key and excludes dust from entering at this opening which might otherwise enter the recess 10 at the locked end 19 of the plunger-key.

I claim—

1. In a lubricating-bearing for axles and in combination with the axle and the hub-box, a wear-sleeve fixed to the axle-arm, having an enlarged rimmed end telescoping with the inner end of the hub-box, and having a slot or channel extending through its enlarged rimmed end, and pockets on each side of the channel, and a plunger-key adapted for insertion into the channel to displace the oil therefrom into the pockets and means for locking the key.

2. A self-lubricating hub-bearing comprising a sleeve interposed between the hub-skein and axle-arm, to receive the wear, said sleeve having a recessed enlargement engaging annular shoulders on the skein and having a longitudinally-disposed channel and staggered pockets at intervals about its circumference, a plunger-key adapted to be inserted in the channel to displace the introduced oil and force it into the pockets, said key having at its outer end a head provided with a depression, and a circular spring on the sleeve enlargement engaging at one end the depression to lock the inserted key.

3. In a self-lubricating hub-bearing, a wear-sleeve interposed between the axle-arm and hub skein or box and provided with a longitudinal slot for receiving a supply charge of oil, and oil-distributing pockets, the slot and the pockets opening on the axle-arm and on the inner wall of the hub skein or box, and means for displacing the oil from the charging-slot into the distributing-pockets.

In testimony whereof I affix my signature in presence of two witnesses.

THEODORE THISTLEWOOD.

Witnesses:
LEVI C. JACOBS,
WILLIAM H. KNOX.